US008640201B2

(12) United States Patent
Kay et al.

(10) Patent No.: US 8,640,201 B2
(45) Date of Patent: Jan. 28, 2014

(54) MAIL SERVER COORDINATION ACTIVITIES USING MESSAGE METADATA

(75) Inventors: Jeffrey B. Kay, Bellevue, WA (US); Trevor W. Freeman, Samammish, WA (US); Malcolm Erik Pearson, Kirkland, WA (US); Eric D. Tribble, Bellevue, WA (US); Hao Zhang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1515 days.

(21) Appl. No.: 11/608,861

(22) Filed: Dec. 11, 2006

(65) Prior Publication Data
US 2008/0141346 A1   Jun. 12, 2008

(51) Int. Cl.
*G06F 21/00* (2013.01)

(52) U.S. Cl.
USPC ............... 726/4; 726/16; 726/25; 713/168; 713/173; 709/206; 709/225; 709/226

(58) Field of Classification Search
USPC ............................................. 726/4; 709/206
See application file for complete search history.

(56) References Cited

U.S. PATENT DOCUMENTS

| 5,406,557 | A  | * | 4/1995  | Baudoin ..................... 370/407 |
| 6,266,692 | B1 |   | 7/2001  | Greenstein ................. 709/206 |
| 6,959,324 | B1 |   | 10/2005 | Kubik et al. ................ 709/206 |
| 7,103,599 | B2 |   | 9/2006  | Buford et al. ............... 707/10 |
| 2002/0049790 | A1 | * | 4/2002  | Ricker et al. ............... 707/513 |
| 2002/0091776 | A1 |   | 7/2002  | Nolan et al. ................ 709/206 |
| 2002/0120763 | A1 | * | 8/2002  | Miloushev et al. ......... 709/230 |
| 2003/0229672 | A1 |   | 12/2003 | Kohn ........................... 709/207 |
| 2004/0064537 | A1 | * | 4/2004  | Anderson et al. .......... 709/223 |
| 2005/0198159 | A1 |   | 9/2005  | Kirsch ......................... 709/206 |
| 2005/0198169 | A1 | * | 9/2005  | Holten et al. ............... 709/206 |
| 2006/0010242 | A1 |   | 1/2006  | Whitney et al. ............. 709/229 |
| 2006/0053200 | A1 | * | 3/2006  | McCown .................... 709/206 |
| 2006/0168057 | A1 |   | 7/2006  | Warren et al. ............... 709/206 |
| 2006/0200669 | A1 |   | 9/2006  | Tribble et al. .............. 713/169 |
| 2007/0169199 | A1 | * | 7/2007  | Quinnell et al. ............ 726/25 |
| 2008/0005139 | A1 | * | 1/2008  | Hysom et al. ............... 707/101 |

OTHER PUBLICATIONS

"Exchange 2007 Transport Permissions Model", 2006, http://www.microsoft.com/technet/prodtechnol/exchange, 18 pages.
PMDF Version 6.3, "Internet Messaging for Windows, OpenVMS, Tru64 UNIX, and Solaris", Process Software™, Mar. 2006, 6 pages, http://www.process.com/tcpip/pmdfds63.pdf.
The Exchange 2007 Beta Wiki, Transport Underlying Permission Model, Last Modified Sep. 13, 2006, http://www.exchangeninjas.com/TransportUnderlyingPermissionModel, 3 pages.

* cited by examiner

*Primary Examiner* — Morshed Mehedi
*Assistant Examiner* — Jason Lee
(74) *Attorney, Agent, or Firm* — Woodcock Washburn, LLP (57) ABSTRACT

In a distributed electronic messaging system authorized information comprising metadata concerning a message is passed along from one mail server to another mail server. A receiving computer determines if the sending computer has the necessary authorizations to pass along the metadata. If so, the authorized information is passed along with the message body, enabling repetitious actions to be eliminated. If the sending computer is not authorized to pass along the metadata, the metadata is stripped off the message, changed or annotated.

10 Claims, 4 Drawing Sheets

MAIL SERVER COORDINATION ACTIVITIES USING MESSAGE METADATA

BACKGROUND

Email has become an increasing popular way to communicate. A number of email systems are commercially available, including Microsoft Exchange, IBM Lotus Notes, Sendmail, Postfix and others. The format of email messages in general usage is that defined by the Multipurpose Internet Mail Extensions (MIME) standard. MIME-compliant email messages consist of two major sections: the header and the body. The header includes information regarding the sender, the receiver, a subject line or summary, the time and date that the message was originally sent and other information about the email. The body is the message itself, and may include or be composed of text or files of various types.

Each header field typically has a name and a value. For example, the value for the receiver or "To" field in the header typically is the person or entity to whom the email is addressed. The person listed in the "To" field is not necessarily related to the address or addresses to which the message is delivered. The actual delivery list is supplied in the envelope, not extracted from the header content. The "To" field is similar to the greeting at the top of a conventional letter which is delivered according to the address on the outer envelope. For example, the salutation on the letter can be "Resident" while the envelope address can read "John Doe". Similarly, the sender or "From" field does not have to be the real sender of the email message. In fact, it is very easy to falsify the "From" field so that a message seems to be from one entity when it actually originated from someone else. Other information in the header is also susceptible to misrepresentation.

It would be helpful if there were a way to pass information securely between distributed email servers using metadata in email in a way that limits or eliminates the potential for misrepresentation by an untrusted party in such a way as to eliminate duplicative processing while allowing for separation of function. To date no such means are known.

SUMMARY

In a distributed electronic messaging system authorized information comprising metadata concerning a message is passed along from one mail delivery agent or mail transfer agent (MTA) to another mail delivery agent or MTA. Message metadata may be stored in a header accompanying the message body or the metadata may be associated with the envelope of the message. A sending computer (computer 1) and a receiving computer (computer 2) exchange authentication information (information that enables the receiving computer to determine that the sending computer is authentic or not authentic). Computer 2 evaluates the received authentication information and authenticates computer 1 (i.e., determines and validates the identity of computer 1). If computer 2 determines that computer 1 is authorized to pass along the metadata stored in the header or associated with the envelope, computer 2 accepts the authorized metadata that is passed along with the message body. If computer 1 is not authorized to pass along the information stored in the header, the information stored in the header or associated with the envelope may be stripped off the message by computer 2 before computer 2 sends the message on to the next computer (computer 3) in the chain. The message may either be passed without the unauthorized information or new metadata may be generated by computer 2 and passed along with the message body to the next receiving computer, computer 3, or the unauthorized information may be passed, annotated with an indication that the information is not known to be valid, or the receiving computer may perform processing or not perform processing based on knowing that the information is not authorized. Computer 2 (now acting as a sending computer) may also identify and authenticate computer 3 before sending the message on to computer 3. If computer 3 is not authorized to receive the metadata, computer 2 may choose not to send the metadata to computer 3 to prevent providing the information to computer 3, or pass the information with an indication that the information is not known to be valid, etc. as listed above. Computer 3 authenticates the sending computer (computer 2) to determine if computer 2 has the necessary authentication that authorize it to pass along the metadata stored in the header or associated with the envelope. This process is repeated until the message is delivered to the intended mailbox or forwarding to another mail messaging system (belonging to another enterprise).

The described mechanism enables a sending server to attempt to authenticate itself to a receiving server in the same messaging system (the receiving server belongs to the mail messaging of the same enterprise as does the sending server) or in a different messaging system (the receiving server belongs to the mail messaging of a different enterprise as does the sending server) and enables the receiving server to authorize the authenticated sending server to pass authorized metadata (information about the message or its processing) along with the message body. Thus a mail server with the correct authorization is able to pass privileged information in a secure fashion. If the sending server does not have the authorizations necessary to submit the metadata, a receiving server can indicate that the information is not necessarily valid. For example, the receiving server can remove received metadata, may ignore or fail to act based on the metadata, or may otherwise indicate that the metadata is not necessarily valid such as by quoting it as "computer 1 claimed . . . . " and so on. Authorized metadata may include information about work that has been done including authentication of a message sender, whether or not anti-spam software or anti-virus software has been run or any other information. Because the authorized information is protected from abuse, the authorized information can be relied on within the enterprise as correct, enabling duplicative work to be avoided or enabling the receiving computer to act based upon the information passed to it, enabling coordination between intra-enterprise mail messaging computers. (For example, if computer 1 is authentic and has the authorization to pass information that indicates that a virus scan has been run on the message, computer 2 may safely elect not to run the virus scan. Another example: if computer 1 is authentic and has the authorization to pass information that indicates that a virus scan has been run on the message, a mail display program may display an icon next to the message in the mailbox. These examples are meant to be illuminative only and do not restricted the scope of the invention.)

DETAILED DESCRIPTION

Overview

In some distributed electronic messaging systems such as Microsoft's Exchange, IBM Lotus Notes, Sendmail and Postfix an edge server receives mail at the edge of the enterprise and forwards the message either to an agent that delivers the message into a user mailbox or to an internal hub. The internal hub may pass the message to the agent that delivers the message into the user mailbox or may pass the message to a second internal hub. This process may continue several times before the message is finally delivered to a user mailbox or passes back out of the enterprise. During the message delivery process, message sender authentication information, SPAM confidence levels, virus scan information and other types of information may be added to the message by adding information to one or more headers associated with the message. Incorrect or inaccurate information may be placed in a header in an attempt to circumvent mail messaging controls.

For example, suppose that a message from an external network is delivered to an edge server in a distributed messaging system. Suppose the message indicates that it is from Company X. Suppose that verification measures have been taken so that it is known that the message did indeed come from Company X. It would be helpful if that information could be conveyed in such a way that the user could be informed that the message did come from Company X and that each of the receiving MTAs could also be so informed, eliminating repetitious verification processing or permitting verification that would otherwise be impossible (e.g., verifying that the original source was "X" can frequently only be done while there is an open connection from "X" in the original mail transfer). One way to convey this information from server to server is to add the information onto a MIME header associated with the message. That is, the information added to the MIME header may indicate that the message has been authenticated as coming from Company X. The MIME header may comprise an attribute value pair, where the attribute is "authenticated from" and the value is "Company X". Because the header itself may be inadvertently or maliciously added or tampered with, it would be helpful to have a mechanism so that it is known that the information is legitimate and correct and has not been inadvertently or maliciously added or changed.

In accordance with some embodiments of the invention, in a distributed electronic messaging system, a header firewall that is able to remove, change or annotate unauthorized headers or metadata associated with the envelope from inbound or outbound email messages is implemented on each mail transfer agent or MTA, mailbox or other mail messaging computer. Information may be removed or left on based on the authentication and authorizations of the message submitter or the message recipient.

In accordance with some embodiments of the invention, header information from an authenticated server is passed to the receiving server if the sending server has the privileges that allow it to pass that type of information. Different types of information may be stored in different types of headers and any particular computer may be authorized to send or receive one or more of the different types of headers. In some embodiments of the invention, privileges are implemented via access control levels or ACLS. The access control list (ACL) is a concept in computer security used to enforce privilege separation. It is a means of determining the appropriate access rights to a given object or piece of information depending on certain aspects of the process that is making the request (e.g., the identity of the computer running the process and that identity's presence in the appropriate ACL, associated with the appropriate rights or permissions. Additionally, an individual identity may be considered part of an ACL either directly or indirectly where the identity is a member of a group that is then noted in the ACL). It will be appreciated that authorization implemented by means other than ACLs are included within the scope of the contemplated invention.

In some embodiments of the invention, the authentication/ privilege mechanism is enforced by a header firewall residing on a mail messaging computer. A header firewall acts on a mail message based on the privileges extended to the sender or recipient. The sending and receiving header firewall may remove one or more headers from a message based on the privileges extended. A sending and a receiving header firewall may be implemented on each mail messaging computer in the distributed mail messaging system. The receiving header firewall may remove one or more headers from a message before sending the message to the next agent in the system when the sending computer does not authenticate as belonging to the enterprise mail system or when the sending computer does not have the privileges required to pass the indicated type of information. Similarly, the receiving header firewall may leave one or more headers on a message when sending the message to the next agent in the system when the sending computer does authenticate as belonging to the enterprise mail system or when the sending computer is authorized to pass the indicated type of information. The sending header firewall may remove one or more headers from a message before sending the message to the next agent in the system when the receiving computer does not authenticate as belonging to the enterprise mail system or when the receiving computer does not have the privileges required to receive the indicated type of information. Similarly, the sending header firewall may leave one or more headers on a message when sending the message to the next agent in the system when the receiving computer does authenticate as belonging to the enterprise mail system or when the receiving computer does have the privileges (required to receive the indicated type of information. An MTA may add a new header to the message, replace an existing header or may modify an existing header.

Exemplary Computing Environment

Figure 1:
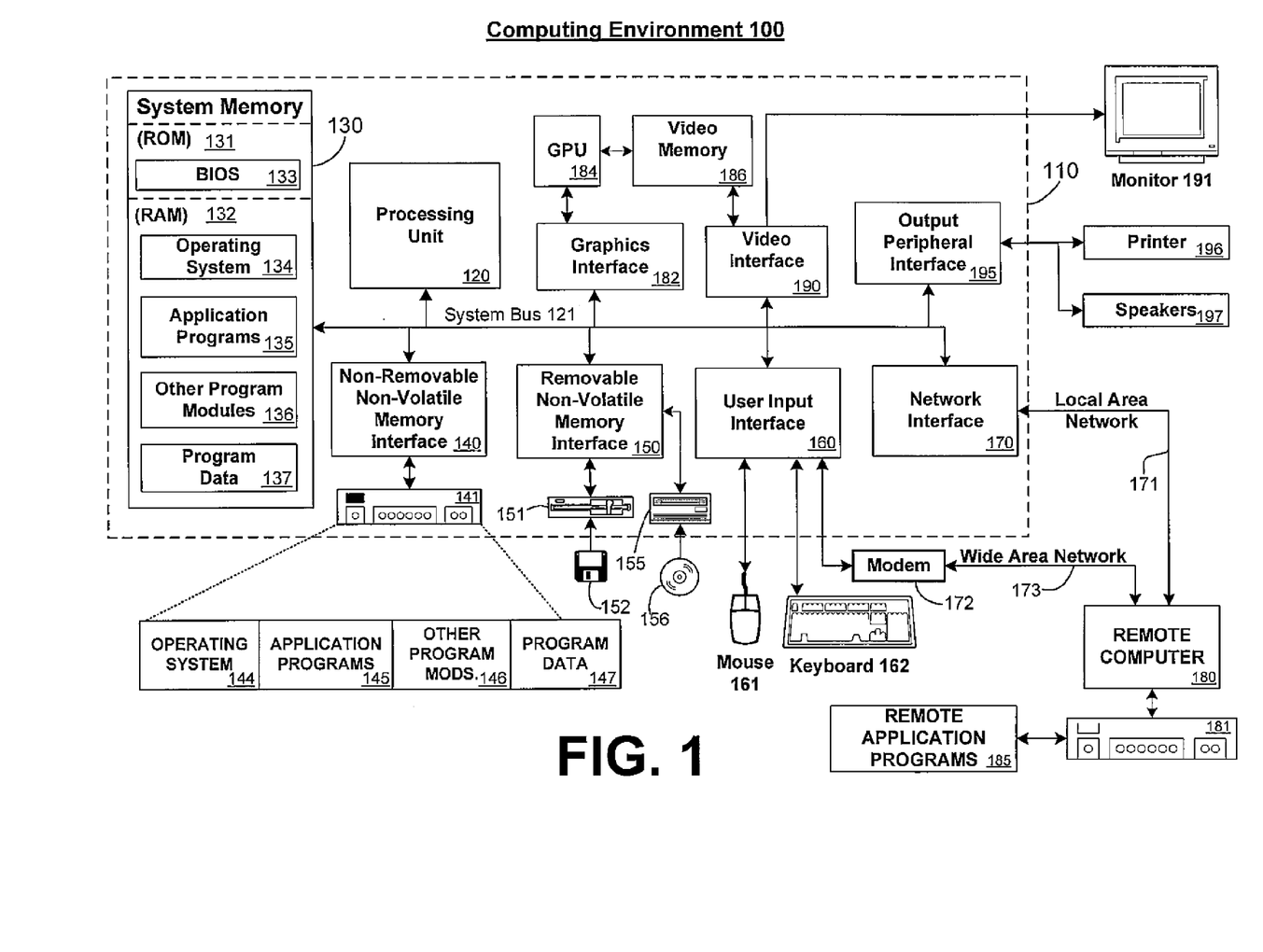
FIG. 1 is a block diagram illustrating an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Mail Server Coordination Using Metadata

The delivery of email generally requires the use of a client program that enables a user to send and receive email, a Mail Transfer Agent (MTA), a server program that enables email transfers from one machine to another and a Mail Delivery Agent (MDA) that puts mail content into a user's mailbox. SMTP (Simple Mail Transfer Protocol) is a protocol in common usage for sending and receiving email. The two hosts participating in an SMTP transaction are the "SMTP client" or "SMTP sender" and the "SMTP server" or "SMTP receiver", although a particular host may act as either a server or a client. The SMTP client transfers the email to one or more SMTP servers by determining the address of an appropriate host running an SMTP server by resolving a destination domain name and establishing a two way transmission channel to that SMTP server.

Figure 2:
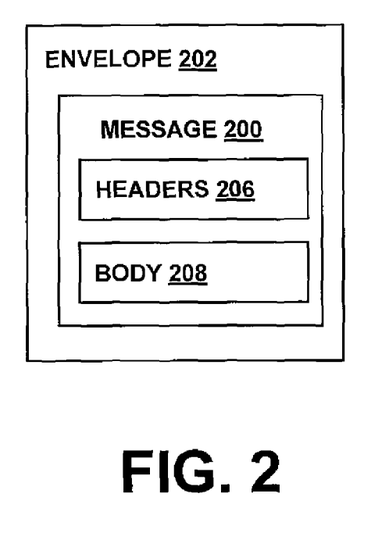
FIG. 2 is a block diagram of a system for mail server coordination using metadata associated with the message in accordance with some embodiments of the invention.

FIG. 2 illustrates a common structure for an email message 200 although it will be appreciated that other equally valid message structures are contemplated. Email message 200 may include one or more headers 206 and a body 208. One or more of the headers 206 may be a header, where a header includes information that is able to be authenticated as correct or not tampered with and therefore can be relied on by the receiving intra-enterprise computer. Each header may comprise an attribute/value pair. For example, a header attribute may be "authenticated from" and a value for a particular message header may be "CompanyX"; a header of another type might be an attribute/value pair of "virus-scanned/no threat detected", or "anti-spam run/spam confidence level=n", or any other information about or concerning the message. A header in accordance with embodiments of the invention may be used to store and pass metadata associated with the message as described more fully below. An envelope 202 may be associated with the message. An envelope is part of the delivery process. Envelope data is typically used for transport purposes (like the list of recipients that the MTA is still responsible for delivering or the address to which to deliver any reports about the message if the message cannot be delivered). In contrast, header data holds information or metadata about the message which is useful after the message has been delivered (for instance, the subject, the set of recipients that the mail was originally sent to, the date when the message was sent, etc.) In some embodiments of the invention, metadata concerning the message is associated with the envelope instead of or in addition to being stored in headers.

Figure 3:
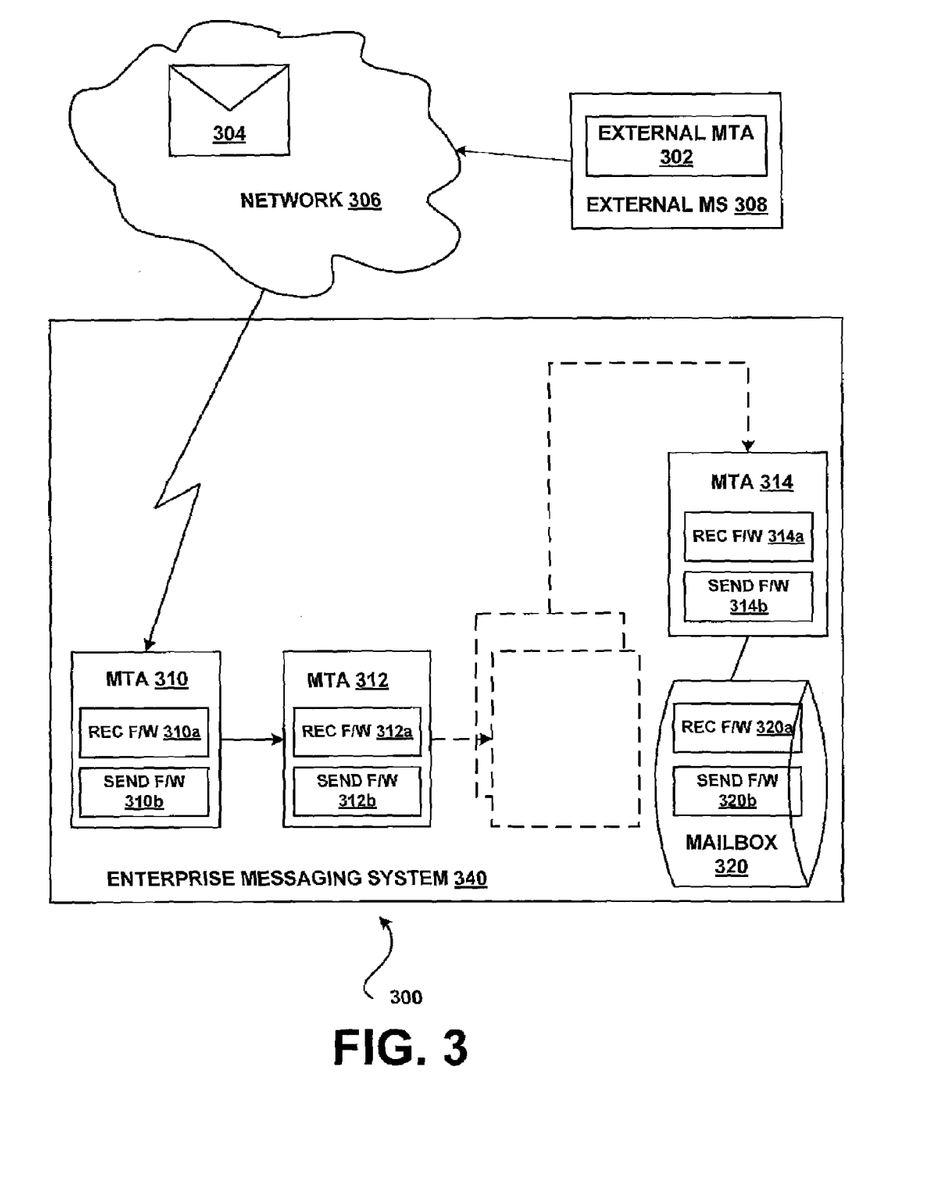
FIG. 3 is a block diagram of an exemplary message in accordance with some embodiments of the invention.

FIG. 3 illustrates a system 300 for coordinating mail server activities using headers in accordance with some embodiments of the invention. One or more components of the system 300 may reside on one or more computers such as computer 110 described above with respect to FIG. 1. System 300 may include the messaging system of one or more enterprises (e.g., messaging systems 308 and 340). A messaging system such as messaging system 340 may include one or more MTAs 310, 312 . . . 314 and one or more mailboxes 320 belonging to a single enterprise. Other devices well-known in the art but not illustrated in FIG. 3 may also be included in messaging system 340. It will be appreciated that messaging system 340 may include only one MTA or may include two or more MTAs. An MTA may be an edge server or an internal hub. In any particular messaging system zero, one or more edge servers may exist and one or more internal hub servers may exist. MTAs 312 . . . 314 represent internal hubs of enterprise messaging system 340. In general an edge server determines if the message is from whom it says it is from and performs anti-spam and anti-virus processing. The functionality of internal hubs relates to putting messages in mailboxes, although functionality may vary from system to system and from server to server. Hence, an edge server may include some or all of the functionality normally attributed to an internal hub and vice versa. In FIG. 3, MTA 310 represents an edge server because an incoming mail message 304 is received from a network 306 by MTA 310. Messaging system 340 may be communicatively connected to network 306. Network 306 may represent the Internet, an intranet or any other type of communications network capable of sending or receiving email messages. It will be appreciated that mail transferred into enterprise messaging system 340 is not always delivered into a mailbox. For example, mail can be undeliverable or mail can come in and just be routed back out again.

In accordance with embodiments of the invention, each of the MTAs may include a sending header firewall and/or a receiving header firewall. For example, in FIG. 3, MTA 310 includes receiving header firewall 310a and sending header firewall 310b, MTA 312 includes receiving header firewall 312a and sending header firewall 312b, and MTA 314 includes receiving header firewall 314a and sending header firewall 314b, although it will be appreciated that an MTA having no header firewalls or only a sending header firewall or only a receiving header firewall is contemplated. Similarly, a mailbox 320 may have a receiving header firewall 320a and a sending header firewall 320b. The function of a receiving header firewall is to authenticate the MTA from whom the receiving MTA receives the message and to determine if the sending MTA has the permissions required to transfer the header(s) associated with the message. That is, the function of the receiving header firewall may be to decide whether the submitter is allowed to pass the information that the submitter is trying to pass with a message coming into the receiving MTA. The function of the sending header firewall is to determine whether the MTA who will receive the message is authorized to receive the type of information contained in the header or headers associated with the message. That is, the function of the sending header firewall may be to decide whether the MTA that is next in the chain to receive the message is authorized to receive the information included in one or more headers associated with the message being passed on. Thus it will be appreciated that any particular sending or receiving header firewall may strip different headers from the message in accordance with different privileges associated with inbound or outbound mail recipients. Typically, an external server (e.g. an extra-enterprise server such as server 306 belonging to a different enterprise messaging system 308) would be expected to have fewer sending and receiving privileges in the receiving enterprise (e.g., enterprise 340) that an internal server (an MTA within enterprise 340) would be expected to have.

Suppose that MTA 310 has received an outbound message from MTA 312 and is going to send the message out to the network. Suppose that an authenticated and authorized internal MTA has performed virus checking on the message and has determined that no virus threat has been detected. Perhaps it has been determined that this information should not be sent along with the outbound message because the external mail system recipient should perform their own virus checking. Sending header firewall 310b may thus strip this header from the message before sending it to the external network. Hence the same receiving header firewall may strip different types of headers from the message depending on whether the email is headed into the organization or out of the organization.

In accordance with embodiments of the invention, an incoming mail message such as message 304 may be received from network 306 from external MTA 302 (i.e., MTA 302 does not belong to the same business enterprise as do MTAs 310, 312 . . . 314). Incoming mail message 304 may be structured as described above with respect to FIG. 2 or may be structured in another fashion. Message 304 may be received by MTA 310 and transferred to internal hub MTA 312. Internal hub MTA 312 may pass message 304 to another internal hub, which may pass message 304 on to another internal hub until message 304 is received at a user mailbox or determined to be undeliverable. During its journey from network 306, message 304 may be altered as described below. Embodiments of the invention address the need to convey information learned or determined on one server to the next server in the path of the message from edge to mailbox.

Receiving header firewall 310a examines metadata associated with the mail message 304. In some embodiments of the invention, this metadata is stored in a header of mail message 304. When message 304 is received by edge server 310, edge server 310 may perform processing to verify that a header of message 304 identifying the sender of the message is accurate or alternatively, may create or change a different type of header for message 304. When edge server 310 passes the message 304 to the next MTA (e.g., internal hub 312, the edge server 310 authenticates itself to the internal hub server 312. If the hub server 312 recognizes the edge server 310 as an authenticated entity and as one that has the permissions necessary to transfer this type of header then as the message 304 moves from the edge server 310 to the internal hub 312, the header stays on the message 304. If however, the edge server 310 is not able to authenticate itself to the internal hub 312 or does not have the necessary privileges to transfer this type of header, the internal hub 312 may strip, change or annotate the header, as described above, of the message 304. Similarly, suppose that in addition to a first header which contains authentication information for the sender of the mail message, the edge server 310 performs anti-spam processing. The edge server 310 may add an additional header to the message (header 2) indicating that anti-spam software has been run on the message and that the software has determined a value indicating the likelihood that the message is spam. It will be appreciated that these are examples of header information only and the invention is not limited to any particular type of processing occurring at the MTAs. Before edge server 310 sends message 304 on to the next MTA, edge server 310 may authenticate the receiving server and determine if its privileges permit it to receive the headers associated with message 304. Suppose MTA 312 successfully authenticates and is authorizes to receive the two types of headers associated with message 304. When edge server 310 sends the message 304 with the two headers to MTA 312, MTA 312's receiving header firewall will examine each header and determine if the sending MTA is properly authenticated and for each header will determine if the sending MTA has the proper permissions to send each header. If for example, MTA 312 determines that edge server 310 has the necessary permissions to send header 1 but does not have the necessary permissions to send header 2, only header 2 may be stripped from the message. If alternatively, MTA 312 determines that edge server 310 does have the necessary permissions to send headers 1 and 2, headers 1 and 2 may be left on the message. Suppose MTA 312 determines that edge server 310 does not have the necessary permissions to send header 2. MTA 312 may run the anti-spam software itself on the message and append a new header onto the message. This process is continued until the message and its headers are delivered to the user mailbox or the path of the message through messaging system 340 is otherwise completed.

It will be appreciated that the above described mechanism although described within the context of receiving mail from outside the organization also works on mail that originates from within the organization. That is hub 312 may initiate a mail message and pass the message to hub 314.

Figure 4:
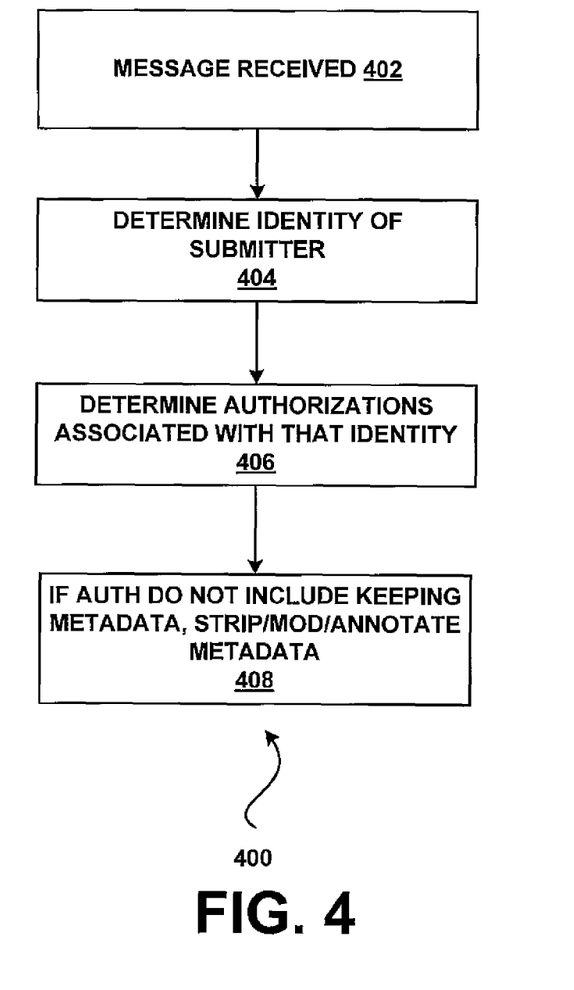
FIG. 4 is a flow diagram of a method for using metadata associated with the message to coordinate mail server activities in accordance with some embodiments of the invention.

FIG. 4 illustrates a method for coordinating mail server activities using metadata in accordance with embodiments of the invention. At 402 a message is received at a mail server or MTA. The mail server may be an edge server or an internal hub. The message may be received from with the mail messaging system (from an internal server) or may be received from outside the mail server system (e.g., from a server in an external network).

At 404, the receiving server determines the identity of the sending server. The receiving server may receive information from the sending server that enables the receiving server to authenticate the sending server as a recognized server from within the messaging system, the receiving server may perform processing from which it can determine that the sending server is who he says he is, the receiving server may receive additional information from the sending server that enables the receiving server to determine that the server is who he says he is or some combination of the above may be used to identify the sending server. The process of verifying the identity of the sending server may be called authentication and in some embodiments of the invention, a sending server who cannot be authenticated may be identified as "guest".

At 406 the authorizations associated with the identity are determined. In some embodiments of the invention, authorizations are based on privileges associated with the identity of the sending server are ascertained, although authorizations may be based on other non-privilege-based authorization schemes. Privileges include the ability to send a message, and the ability to send certain types of information along with the message. Thus, a sending server identified as "guest" may or may not have the privilege of sending a message and may or may not have privileges of sending any types of metadata concerning the message along with the message but typically does not. At 408 if the privileges associated with the sending server's identity do not permit the transfer of message metadata, the metadata is stripped from the message before the message is send on. If the sending server is authorized (e.g., the privileges associated with the sending server's identity permit the transfer of message metadata), the metadata is not stripped from (changed, or annotated on) the message before the message is sent on.

For example, suppose a message is received from the Internet at 402. Because the message is received from another organization's message system, the message submitter may be determined to be "guest" (404), meaning someone who is not known to be a mail server within the organization. Suppose that "guest" submitters are not granted the permissions required to submit a header (406). Because the message submitter does not have the necessary permissions, any headers attached to or accompanying the message are removed or stripped from the message (408). Suppose that the receiving MTA (potentially an edge server such as edge server 310) receives the message with any headers originally present stripped off. Suppose the receiving MTA (let us call it the first MTA) now runs an anti-virus scan on the message. The first MTA may now put a header on the message to indicate that a virus was detected or that a virus was not detected. Suppose that no virus threat was detected. The receiving MTA may now place a header attribute pair (e.g., anti-virus/none detected) on the message. At this point the receiving MTA is going to become the sending MTA as it prepares to send the message on to the next MTA in the chain. Suppose the first MTA now connects to the next MTA to receive the message (lets call this MTA the second MTA). Suppose that the first MTA determines the identity of the second MTA (404), determines that the second MTA is one of its own MTAs (that is, the first and second MTAs both below to the message system of the same organization or business enterprise) and determines that the second MTA has the necessary privileges to receive the anti-virus header so that the anti-virus header does not need to be stripped back off at 408. The first MTA sends the message and the anti-virus header to the second MTA. The second MTA receives the message (402), determines the identity of the submitter (404) to be one of its MTAs, determines the privileges associated therewith (406), determines that the first MTA does have the privileges necessary to send an anti-virus header and therefore at 408, does not strip the header from the message. Because the header is not stripped from the message, the second MTA knows that an anti-virus scan was run, and therefore may determine that the second MTA does not need to run the anti-virus scan again (because the header value was "no threat detected"). In this way, duplicative work is avoided but in such a way that no loss of security is involved.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for coordinating mail server activities comprising:
   a processing device; and
   a software module for coordinating mail server activities within a messaging system of an enterprise, the software module resident on a first computing device in the messaging system wherein the software module determines an identity of a second computing device, and determines a set of privileges associated with the identity of the second computing device such that a first privilege of the set of privileges determines whether the second computing device is authorized to send to or receive messages from the first computing device and a second privilege of the set of privileges determines whether the second computing device is authorized to send or receive metadata associated with a message to be sent to or received from the first computing device, wherein the metadata comprises anti-spam information and anti-virus information, wherein the metadata is used by the first computing device to coordinate activities performed by the first computing device, wherein based on a determination that the set of privileges associated with the identity of the second computing device authorizes the second computing device to send the message but fails to authorize the second computing device to send metadata with the message, the metadata is stripped off of the message and replaced with new metadata generated by the first computing device before the message is sent to a third computing device.

2. The system of claim 1, wherein the first computing device and the second computing device belong to a single mail messaging system.

3. The system of claim 1, wherein the first computing device belongs to a first mail messaging system and the second computing device belongs to a second mail messaging system external to the first mail messaging system.

4. The system of claim 1, wherein the first computing device is a mail transfer agent or a mailbox.

5. The system of claim 1, wherein the first computing device is an edge server or an internal hub.

6. The system of claim 1, wherein the metadata is stored in a header associated with the message.

7. A method for coordinating activities in a mail messaging system comprising:

receiving a message from a first computing device;

verifying an identity associated with the first computing device;

based on the identity associated with the first computing device, making a first determination whether or not the first computing device is authorized to send the message and a second determination whether or not the first computing device is authorized to send metadata associated with the message, wherein the metadata comprises anti-spam information and anti-virus information; and based on results of the first determination and the second determination that the first computing device is authorized to send the message but is not authorized to send the metadata, stripping the metadata from the message and replacing the stripped metadata with new metadata before sending the message and the new metadata to a second computing device, wherein the first determination whether or not the first computing device is authorized to send the message and the second determination whether or not the first computing device is authorized to send the metadata are based on a set of privileges associated with the identity associated with the first computing device.

8. The method of claim 7, wherein the metadata is stored in a header associated with the message.

9. A computer-readable storage device comprising computer-readable instructions for executing in a computer environment, the computer-readable instructions comprising instructions that when executed cause the computing environment to:

receive a message from a first computing device;

determine an identity associated with the first computing device;

determine a set of privileges associated with the identity associated with the first computing device, wherein a first privilege of the set of privileges determines whether the first computing device is authorized to send the message and a second privilege of the set of privileges determines whether metadata associated with the message is stripped from the message or is not stripped from the message before the message is sent on to a second computing device, wherein the metadata comprises anti-spam information and anti-virus information; and based on a determination that the first privilege authorizes the first computing device to send the message and that the second privilege fails to authorize the first computing device to send the metadata with the message to the second computing device, strip off the metadata from the message and replace the stripped metadata with new metadata before sending the message to the second computing device.

10. The computer-readable storage device of claim 9, wherein the metadata is stored in a header associated with the message.

* * * * *